United States Patent [19]

Knödel

[11] Patent Number: 5,141,137
[45] Date of Patent: Aug. 25, 1992

[54] VOLUMETRIC DEVICE WITH RECIPROCATING PISTON TO DELIVER DEFINED QUANTITIES OF LIQUIDS

[75] Inventor: Erich Knödel, Wertheim, Fed. Rep. of Germany

[73] Assignee: Walter Graf u. Co. GmbH & Co., Fed. Rep. of Germany

[21] Appl. No.: 573,004

[22] PCT Filed: Nov. 15, 1989

[86] PCT No.: PCT/EP89/01373

§ 371 Date: Aug. 27, 1990

§ 102(e) Date: Aug. 27, 1990

[87] PCT Pub. No.: WO90/05895

PCT Pub. Date: May 31, 1990

[51] Int. Cl.⁵ ............................................. B67D 5/40
[52] U.S. Cl. ..................................... 222/383; 222/309
[58] Field of Search ................... 222/41, 43, 137, 157, 222/309, 372, 380, 383, 482

[56] References Cited

U.S. PATENT DOCUMENTS

| 440,205 | 11/1890 | Smith | 222/482 |
|---|---|---|---|
| 1,454,803 | 5/1923 | Wells | 222/482 |
| 2,351,227 | 6/1944 | Petrone | 222/482 |
| 2,639,839 | 5/1953 | Sokolik | 222/482 |
| 3,067,915 | 12/1962 | Shapiro et al. | 222/309 |
| 3,211,335 | 10/1965 | Shapiro | 222/383 |
| 3,452,901 | 7/1967 | Roach | 222/385 |
| 3,955,930 | 5/1976 | Shapiro | 222/137 |
| 4,260,082 | 4/1981 | Rooney et al. | 222/380 |
| 4,315,454 | 2/1982 | Knödel | 92/248 |
| 4,995,532 | 2/1991 | Knödel | 222/43 |

FOREIGN PATENT DOCUMENTS

| 1061216 | 7/1959 | Fed. Rep. of Germany | 222/380 |
|---|---|---|---|
| 2647206 | 12/1977 | Fed. Rep. of Germany . | |
| 7527527 | 4/1977 | France . | |
| 197246 | 10/1938 | Switzerland . | |

Primary Examiner—Michael S. Huppert
Assistant Examiner—Kenneth Bomberg
Attorney, Agent, or Firm—Lowe, Price, LeBlanc & Becker

[57] ABSTRACT

The invention concerns a volumetric device with reciprocating piston to deliver defined quantities of liquid and includes a piston valve pump and a valve block with intake and discharge valves affixed to a reservoir. The nullify the pressure difference generated upon withdrawing liquid from the hermetically sealed reservoir between this reservoir and the ambient atmosphere, the valve head additionally is provided with a ventilation valve allowing on one hand the inflow of ambient air into the reservoir and on the other hand preventing the escape of the tiniest amounts of liquids even after lengthy standing.

8 Claims, 1 Drawing Sheet

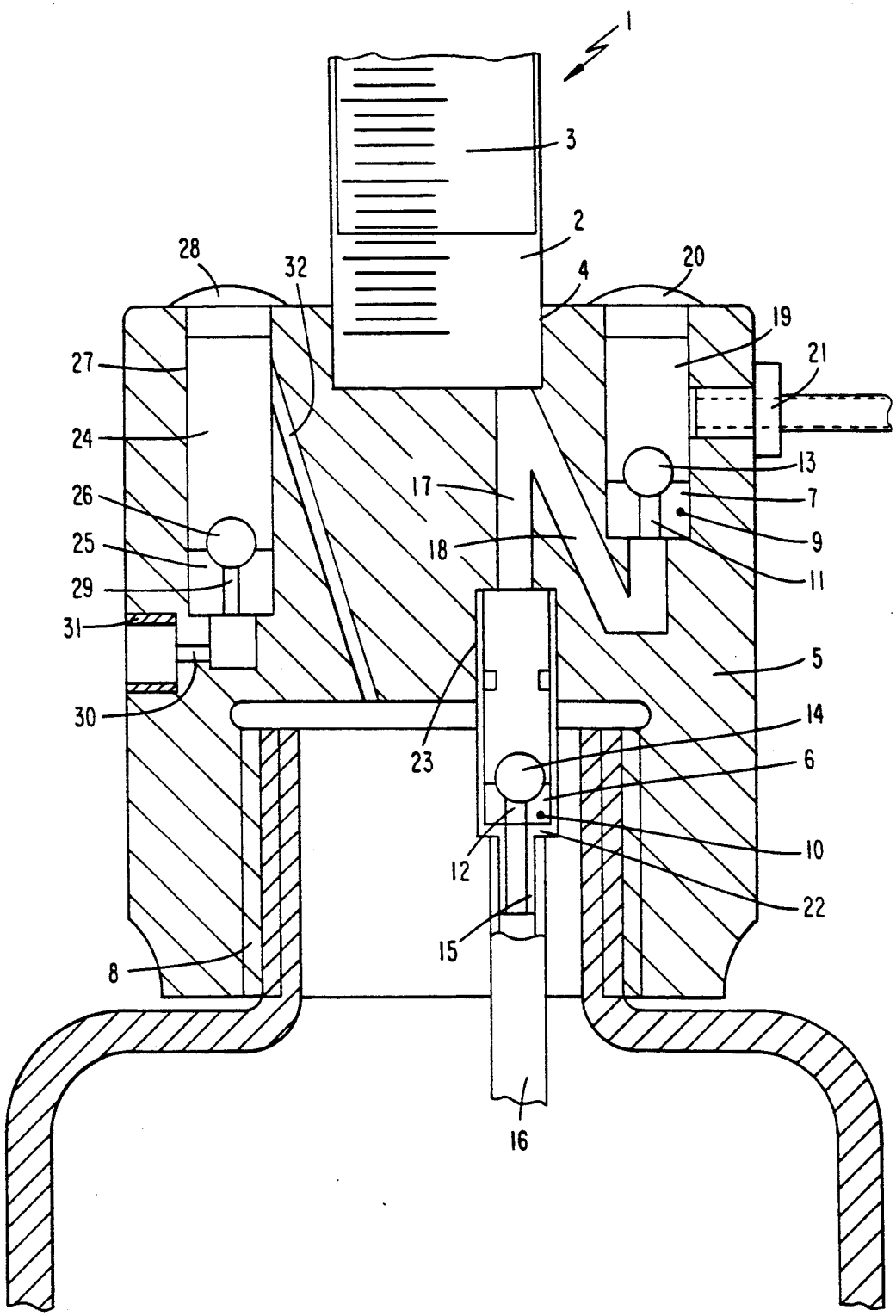
FIG.

VOLUMETRIC DEVICE WITH RECIPROCATING PISTON TO DELIVER DEFINED QUANTITIES OF LIQUIDS

TECHNICAL FIELD

The present invention concerns a volumetric device with reciprocating piston to deliver defined amounts of liquids.

BACKGROUND ART

Such volumetric devices are used both when accurately dispensing liquid, especially corrosive media, and when titrating. They are designed to deliver quantities of liquids in the range of microliters to liters.

German patent 26 47 206 C3 discloses a dosing system for liquids essentially consisting of a piston valve pump and a valve block and affixable to a reservoir. The valve block comprises a discharge valve and an intake valve. Both valves are gravity-actuated ball-valves parallel to each other and mounted essentially vertically in the valve block. The intake valve includes a suction line going to the bottom of the reservoir. The discharge valve passes through a discharge stub to the outside. To withdrawn a specific quantity of liquid, the intake valve is opened by the suction stroke of the piston pump, the discharge valve being closed at the same time, and thereby the dosing cylinder will be filled. If the intake valve is then closed by a reversal in the motion of the piston valve pump, then the dosing cylinder shall be drained through the opened discharge valve and through the discharge stub into a collecting vessel.

Such a dosing instrument incurs the drawback that as a rule a partial vacuum is created in the reservoir upon removal of liquid from it, so that further withdrawal is hampered and may ultimately become impossible. For that reason the valve block screwed in a liquid- and gas-tight manner to the reservoir is provided in practice with a narrow ventilation duct connecting the inside of the reservoir directly to atmosphere. This design too was found to have practical shortcomings. After pressure balance between the reservoir and atmosphere has been reestablished upon withdrawal of liquid, for example, particles of liquid in this reservoir may enter the atmosphere (e.g., by diffusion etc.), in an uncontrolled and nearly unhampered manner with such dosing devices being preferentially used for exceedingly chemically corrosive media, for instance hydrochloric acid and nitric acid, this behavior is ecologically undesirable. Moreover, and especially in clean-room laboratories, uncontrolled discharge of even tiny amounts of gas leads to corrosion of high-sensitivity instrumentation and measurable contamination of many laboratory substances.

In view of this state of the art, it is the object of the invention to create a volumetric device with a reciprocating piston to deliver defined quantities of liquids, which comprises a simple ventilation means for pressure balance between the atmosphere and the reservoir but which simultaneously also assures reliable protection against undesired emission of even the least amount of liquid or gas particles from the reservoir.

SUMMARY OF THE INVENTION

The volumetric device of the invention essentially comprises a reciprocating piston valve pump and a valve block screwed in a liquid- and gas-tight manner on a reservoir (e.g., a bottle). Preferably, the piston valve pump comprises a scale or measuring means to allow withdrawing a precisely defined quantity of liquid from the reservoir.

One intake and one discharge valve are present in the valve block and both preferably are check valves. These check valves may be conventional gravity-actuated ball valves. Other valves that are capable of blocking the liquid in one direction also are applicable, for instance spring-loaded ball valves.

The intake valve communicates directly, for instance by a tube, to the reservoir inside, and preferably this tube extends as far as the reservoir bottom to allow complete emptying of this reservoir. The discharge valve comprises a discharge stub through which the liquid removed from the reservoir and dosed in the piston valve pump will be delivered.

When driving the piston slide-valve pump, the intake valve is opened by the pressure difference between the inner space of the piston slide-valve pump and the reservoir, and the inner space of the piston slide-valve pump will be filled with liquid from the reservoir. The discharge valve remains closed. If thereupon the the reciprocating piston reduces the inner space of the piston slide-valve pump, the intake valve shall be closed, the discharge valve shall be opened, and the liquid will be delivered from the piston slide-valve pump to the outside into a collecting vessel.

The volumetric device of the invention with reciprocating piston for the delivery of defined quantities of liquids comprises a ventilation means in the valve block to nullify the pressure difference between the reservoir inner space and atmosphere. The ventilation means includes a ventilation valve, a first duct connecting the blocking side of the ventilation valve to the ambient atmosphere, and a second duct connecting the direction-of-flow side of the ventilation valve to the inner space of the reservoir.

Preferably but not exclusively, the ventilation valve itself shall be a check valve with a free valve block inserted in such manner into a borehole parallel to the axis of the valve block that the valve shall be gravity-actuated in the direction of blocking. However, as an alternative, the ventilation valve illustratively may be spring-loaded. It must be borne in mind in this respect that the spring material would be subject to corrosion by the liquid being withdrawn, in particular where chemical corrosives are concerned. The borehole receiving the ventilation valve is sealed in a liquid- and gas-tight manner at its open end pointing to the top face of the valve block by a sealing cap, whereby on one hand liquid is precluded from discharging and on the other hand the same pressure as inside the reservoir is present inside the borehole regardless of the ambient pressure.

As stated above, the valve shall preferably include a free valve unit and a valve seat. Preferably the valve element shall be in the shape of a sphere or a cone. The geometry is wholly immaterial however as long as in cooperation with the valve seat, reliable valve closure shall be achieved. The valve seat is ground with extreme accuracy to match in complementary manner the shape of the valve and preferably comprises a central borehole. This central borehole extends from the bottom to the axially opposite end of the valve seat. Alternatively several boreholes are also possible. It is essential in this respect that these boreholes can be sealed reliably relative to the valve element. Both the valve seat and the valve element are preferably a corrosion-proof and chemically extremely resistant material. Agate, ruby, glass, alkali-free sinter ceramics and the like have been found extremely advantageous for that purpose. It must be borne in mind regarding the valve-body material that in addition to corrosion resistance, a specific density shall be required, on one hand to assure reliable closure of the central borehole and on the other hand valve opening already at low pressure reductions. In particular, though not exclusively, ruby valve-bodies do meet these requirements. Additionally, these materials are economical, sufficiently hard and wear-resistant, and can be precision-ground.

Preferably by press-fitting, the valve seat also is kept in a liquid- and gas-tight manner in the borehole of the valve block which, obviously enough, must also be made of a corrosion-proof material, in particular of solid PTFE (polytetrafluoroethylene).

The diameter of the valve element must be at least slightly smaller than that of the borehole of the valve block seating the ventilation valve in order that when the ambient air flows in, the valve element will be able to easily lift off the valve seat without jamming in the borehole, and so that the incoming air can easily pass through the valve element and the inside wall of the borehole on its way to the inner space of the reservoir.

The blocking side of the ventilation valve—in other words that end of the central borehole which is away from the valve element, communicates directly through a first duct with the ambient atmosphere. The first duct extends preferably at least radially from the valve borehole or from the extension of the central borehole of the valve seat to the outside wall of the valve block. As a result, both compactness of the valve block and low drag on the inflowing ambient air are achieved.

In a preferred embodiment of the volumetric device of the invention, this first duct comprises a hook-up means at its radially outer end for an accessory, illustratively an atmospheric-humidity separator. This is especially significant when—in clean rooms—the reservoir liquid may not be contaminated. Illustratively this hookup means in its simplest form may be an inside thread or a Luer lock or a hose stub connector.

The free inner space of the valve borehole directly communicates through a second duct with the inner space of the reservoir. Primarily for reasons of manufacture, this second duct is a so-called oblique duct. The slant of this oblique duct relative to the axis of the valve block is selected in such a way that the extension of its longitudinal axis passes through the top-face aperture of the valve borehole and/or the connection aperture to the reservoir. This assures—in case valve block is cut from a solid block—that this second duct can be drilled for instance through the top-face aperture of the valve borehole or—in the event the valve block is made by injection molding—that the corresponding core can be molded without difficulties before the ejection of the valve block.

The valve block is connected in known manner to the reservoir such as with screws or a conical plug-in connector. The invention is elucidated further below by means of an illustrative embodiment of the volumetric device with reciprocating piston shown in the Figure.

BRIEF DESCRIPTION OF THE DRAWING

The single Figure shows a longitudinal section of a volumetric device with reciprocating piston of the present invention.

DETAILED DESCRIPTION

The volumetric device with reciprocating piston of the invention shown in the Figure comprises a piston-valve pump 1. The piston-valve pump 1 includes a dosing cylinder 2 made of borosilicate glass and of a reciprocating piston 3 made of glass and coated with PTFE. To precisely read the dosing, the dosing cylinder is provided with a scale. The piston-valve pump 1 is pressed in liquid- and gas-tight manner into a matching clearance of a valve block 5. The valve block 5 itself consists of a solid PTFE block and is tightened by a threading 8 to a reservoir 8a.

The valve block 5 comprises an intake valve 6 and a discharge valve 7. Both valves are designed in manner known per se as gravity-actuated ball valves and are mounted with their axes parallel to each other and to the longitudinal axis of the valve block 5. The valve seats 9, 10 are made of precision-ground borosilicate glass and comprise each a central borehole 11, 12 which in the rest position shall be closed by the balls 13, 14. The balls are made of ruby.

At its blocking side the intake valve 6 is provided with a hose stub 15 receiving a PTFE hose 16. This PTFE hose 15 extends as far as the bottom (not shown) of the reservoir 8a. At its open side opposite the blocking side the intake valve 6 communicates through a duct 17 with the piston-valve pump 1. The intake valve 6 is seated in a bush 22 press-fitted into a clearance 23 in the bottom zone of the hook-up aperture. This duct 17 is continued by another duct 18 to the blocking side of the discharge valve 7.

The discharge valve 7 is seated in a borehole 19 in the valve block 5. The borehole 19 is hermetically sealed at the top-face by a cap 20. The valve side opposite the blocking side of the discharge valve 7 communicates through a discharge stub 21 with the ambient atmosphere. This discharge stub 21 serves to deliver the dosed liquid from the dosing cylinder 2 to a collecting vessel (not shown).

The invention provides a third valve in the form of a ventilation valve 24 in the valve block 5. In this embodiment, the ventilation valve 24 also is gravity-actuated. Essentially the ventilation valve consists of a valve seat 25 made of corrosion-proof borosilicate glass and of a ruby ball 26 with a diameter less than the borehole inside diameter. The valve seat 25 is press-fitted in liquid- and gas-tight manner into a borehole 27 open toward the top face of the valve block 5. Following insertion of the valve 24, the borehole 27 also is sealed in liquid- and gas-tight manner by a sealing cap 28.

The valve seat 25 comprises a precision-ground, complementarily matching zone with the bottom leading into a central borehole 29 passing axially through the valve seat 25 and communicating with a first duct 30. This first duct 30 leads radially outward directly into the ambient atmosphere. In its radially outer zone, the first duct 30 includes an area 31 provided with an interior thread. This may serve illustratively as a humidity separator.

The valve borehole 27 comprises in its axially outer zone a hook-up aperture to a second duct 32. This second duct 32 is an oblique duct and extends through the valve block 5 as far as the bottom of the hook-up borehole and accordingly communicates directly with the inner space of the reservoir 8a. The slope of the second duct 32 is so selected for manufacturing reasons that this second duct 32 can be inserted in problem-free manner through the top-face aperture of the valve borehole 27 by being drilled into the valve block 5.

The operation of the volumetric device of the invention is characterized in that the pressure difference between the inner space of the reservoir 8a and the ambient atmosphere generated when withdrawing liquids through the intake valve shall lift the ball from the valve seat in the ventilation valve, whereby air from the ambient atmosphere will flow through the first duct, the central borehole of the valve seat and the second duct into the reservoir inner space until the pressure difference has been nulled. Upon elimination of the pressure difference, gravity will force the valve ball against the valve seat and will seal it relative to the ambient, whereby the inner space of the reservoir is hermetically sealed relative to the ambient atmosphere.

I claim:

1. A volumetric device for dispensing a predetermined volume of fluid from a fluid reservoir, comprising a valve head having means for mounting the valve head to said reservoir and a piston-valve pump means mounted on the valve head, an intake valve means and a discharge valve means each mounted to the valve head and connected to the piston valve pump means so that, upon actuation of the piston valve pump means, fluid is pumped from the reservoir through the intake valve means and valve head to the discharge valve means; and a ventilation system having a ventilation valve, said ventilation valve including a first duct in the valve head connecting a blocking side of the ventilation valve to ambient atmosphere and a second duct connecting an opposite side of the ventilation valve with the reservoir, wherein the ventilation valve (24) is a check valve comprising a borehole (27) arranged generally in the direction of the vertical axis of the valve head and a free valve element (26) being inserted into said borehole (27) and being actuated by gravity toward sealing of a valve seat (25).

2. Volumetric device defined in claim 1, wherein the borehole (27) extends downward from the top-face of the valve head (5) and substantially parallel to said vertical axis and the open end of said borehole at a top-face of the valve head (5) is closed in a liquid- and gas-tight manner by a sealing cap (28).

3. Volumetric device defined in claim 2, wherein the valve seat (25) of the ventilation valve is held in a press-fitted and liquid- and gas-tight manner against a wall of the borehole (27) and includes a central borehole (29) extending parallel to the longitudinal axis of the borehole (27) connecting the first duct to the borehole (27) in the open position of the ventilation valve.

4. Volumetric device defined in claim 3, wherein the valve seat (25) is made of at least one of agate, ruby or alkali-free sinter ceramics.

5. Volumetric device defined in claim 2, wherein the valve element (26) consists of at least one of agate, ruby or alkali-free sintered ceramics and has a diameter at least slightly less than that of the borehole (27).

6. Volumetric device defined in claim 2, wherein the first duct (30) extends generally radially from the borehole (27) to a side wall of the valve block (5).

7. Volumetric device defined in claim 6, wherein the first duct (30) is provided at its radially outer end with a hook-up means (31).

8. Volumetric device defined in claim 2, wherein the second duct (32) is so arranged in the valve head (5) that the extended longitudinal axis passes through a top-face aperture of the borehole (27).

* * * * *